(12) United States Patent
Kim et al.

(10) Patent No.: US 11,056,714 B2
(45) Date of Patent: Jul. 6, 2021

(54) SECONDARY BATTERY

(71) Applicant: LG CHEM, LTD., Seoul (KR)

(72) Inventors: Sun Kyu Kim, Daejeon (KR); Seok Koo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 334 days.

(21) Appl. No.: 15/969,123

(22) Filed: May 2, 2018

(65) Prior Publication Data

US 2018/0351206 A1 Dec. 6, 2018

(30) Foreign Application Priority Data

Jun. 1, 2017 (KR) ........................ 10-2017-0068510

(51) Int. Cl.
| | |
|---|---|
| *H01M 10/00* | (2006.01) |
| *H01M 10/0525* | (2010.01) |
| *H01M 10/42* | (2006.01) |
| *H01M 4/66* | (2006.01) |
| *H01M 10/04* | (2006.01) |
| *H01M 50/502* | (2021.01) |

(Continued)

(52) U.S. Cl.
CPC ....... *H01M 10/0525* (2013.01); *H01M 4/661* (2013.01); *H01M 10/0463* (2013.01); *H01M 10/4207* (2013.01); *H01M 50/502* (2021.01); *H01M 50/531* (2021.01); *H01M 10/052* (2013.01); *H01M 10/0585* (2013.01); *H01M 50/557* (2021.01)

(58) Field of Classification Search
CPC ............. H01M 10/0525; H01M 4/661; H01M 10/0463; H01M 2/202; H01M 2/26; H01M 10/4207; H01M 2/0212; H01M 10/0585; H01M 10/052

See application file for complete search history.

(56) References Cited

U.S. PATENT DOCUMENTS

| | | | |
|---|---|---|---|
| 9,269,984 B2 | 2/2016 | Han et al. | |
| 2008/0292952 A1* | 11/2008 | Yanagihara | ........... H01M 2/266 429/162 |

(Continued)

FOREIGN PATENT DOCUMENTS

| | | |
|---|---|---|
| KR | 10-2008-0015165 A | 2/2008 |
| KR | 10-2008-0038465 A | 5/2008 |
| KR | 10-2011-0053899 A | 5/2011 |

OTHER PUBLICATIONS

Office Action dated Dec. 18, 2019, issued in corresponding Korean Patent Application No. 10-2017-0068510.

*Primary Examiner* — Nicholas P D'Aniello
(74) *Attorney, Agent, or Firm* — Morgan, Lewis & Bockius LLP

(57) ABSTRACT

Provided is a secondary battery that is capable of reducing resistance. The secondary battery includes an electrode assembly in which a positive electrode and a negative electrode are alternately laminated with a separator therebetween, a first bus bar laminated on the outside of the positive electrode disposed on the outermost portion of one side of the electrode assembly with a separator therebetween, a second bus bar laminated on the outside of the negative electrode disposed on the outermost portion of the other side of the electrode assembly with a separator therebetween, and a case accommodating the electrode assembly, the first bus bar, and the second bus bar.

12 Claims, 3 Drawing Sheets

(51) Int. Cl.
  _H01M 50/531_  (2021.01)
  _H01M 10/0585_  (2010.01)
  _H01M 10/052_  (2010.01)
  _H01M 50/557_  (2021.01)

(56) References Cited

U.S. PATENT DOCUMENTS

2011/0117438 A1    5/2011  Han et al.
2013/0196210 A1*   8/2013  Kim .................. H01M 10/0413
                                                        429/153

\* cited by examiner

SECONDARY BATTERY

CROSS-REFERENCE TO RELATED APPLICATIONS

This application claims the priority of Korean Patent Application No. 10-2017-0068510 filed on Jun. 01, 2017, in the Korean Intellectual Property Office, the disclosure of which is incorporated herein by reference.

BACKGROUND OF THE INVENTION

Field of the Invention

The present invention relates to a secondary battery, and more particularly, to a secondary battery that is capable of reducing resistance.

Description of the Related Art

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A battery cell having superior structural safety and insulation resistance is disclosed in Korean Patent Publication No. 10-2008-0038465.

A pouch type battery according to the related art uses positive/negative terminals for one terminal in one direction/both directions.

Thus, when the battery has a length increasing in a longitudinal direction thereof, an output may be reduced due to an increase in foil resistance.

SUMMARY OF THE INVENTION

An aspect of the present invention provides a secondary battery that is capable of reducing electric resistance through a bus bar.

According to another aspect of the present invention, there is provided a secondary battery including: an electrode assembly in which a positive electrode and a negative electrode are alternately laminated with a separator therebetween; a first bus bar laminated on the outside of the positive electrode disposed on the outermost portion of one side of the electrode assembly with a separator therebetween; a second bus bar laminated on the outside of the negative electrode disposed on the outermost portion of the other side of the electrode assembly with a separator therebetween; and a case accommodating the electrode assembly, the first bus bar, and the second bus bar.

In the electrode assembly, a positive electrode tab may extend from each of both ends of the positive electrode, and a negative electrode tab may extend from each of both ends of the negative electrode.

A negative electrode active material may be applied to an electrode assembly-side one surface of the first bus bar to increase capacity of the electrode assembly.

The first bus bar may include a negative electrode bus bar tab electrically connected to the negative electrode tab.

The negative electrode bus bar tab of the first bus bar may be connected to the negative electrode tab to reduce electric resistance of the negative electrode tab.

A positive electrode active material may be applied to an electrode assembly-side one surface of the second bus bar to increase capacity of the electrode assembly.

The second bus bar may include a positive electrode bus bar tab electrically connected to the positive electrode tab.

The positive electrode bus bar tab of the second bus bar may be connected to the positive electrode tab to reduce electric resistance of the positive electrode tab.

The secondary battery may further include a positive electrode lead part electrically connected to the positive electrode tab to extend to the outside of the case.

The secondary battery may further include a negative electrode lead part electrically connected to the negative electrode tab to extend to the outside of the case.

The first bus bar may include a foil made of a copper (Cu) material.

The second bus bar may include a foil made of an aluminum (Al) material.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
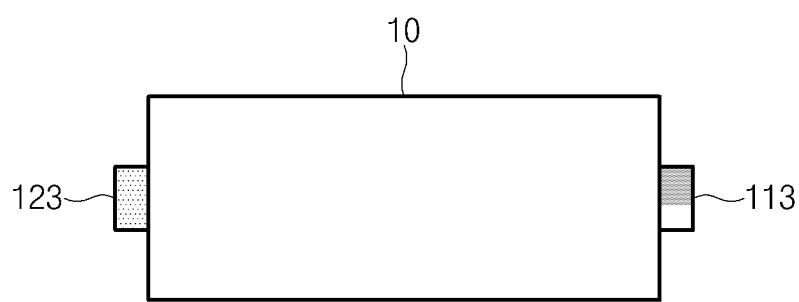
FIG. 1 is a plan view of a secondary battery according to an embodiment of the present invention.

Hereinafter, a secondary battery according to an exemplary embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
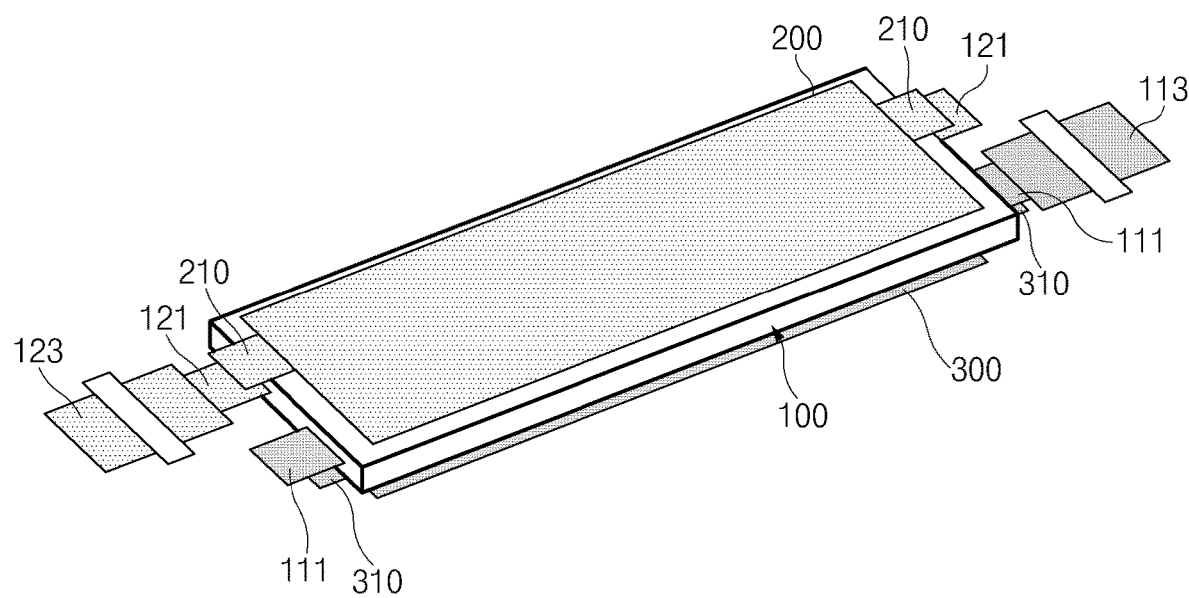
FIG. 2 is a perspective view of an electrode assembly and first and second bus bar in the secondary battery according to an embodiment of the present invention.
Figure 3:
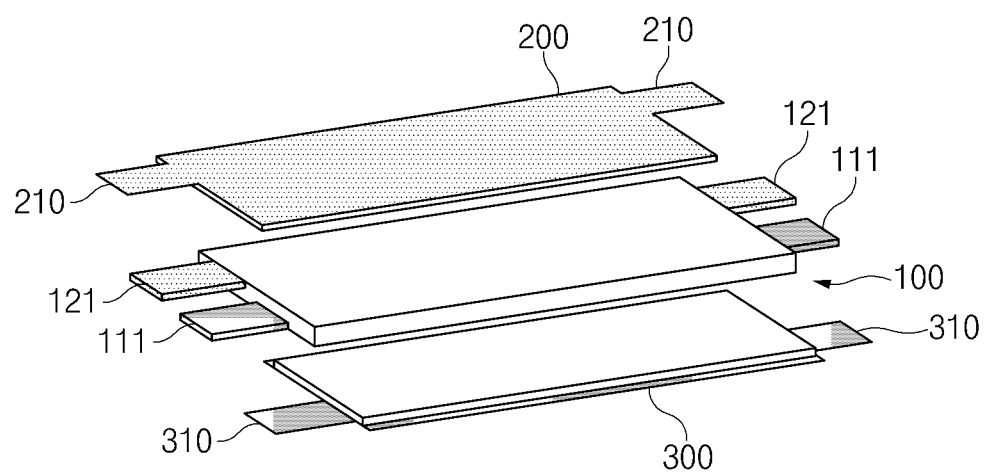
FIG. 3 is an exploded view of the electrode assembly and the first and second bus bars of FIG. 2.

FIG. 1 is a plan view of a secondary battery according to an embodiment of the present invention, FIG. 2 is a perspective view of an electrode assembly and first and second bus bar in the secondary battery according to an embodiment of the present invention, and FIG. 3 is an exploded view of the electrode assembly and the first and second bus bars of FIG. 2.

As illustrated in FIGS. 1 to 3, a secondary battery according to an embodiment of the present invention include an electrode assembly 100 in which a positive electrode and a negative electrode are alternately laminated with a separator therebetween, a first bus bar 200 which is laminated on the outside of the positive electrode disposed on the outermost portion of one side of the electrode assembly 100 with a separator therebetween, a second bus bar 300 which is laminated on the outside of the negative electrode disposed on the outermost portion of the other side of the electrode assembly 100 with a separator therebetween, and a case 10 accommodating the first bus bar 200 and the second bus bar 300.

The electrode assembly 100 may be manufactured by laminating the positive electrode, the negative electrode, and the separator several times so that the separator is disposed between the positive electrode coated with a positive electrode active material and the negative electrode coated with a negative electrode active material.

The positive electrode may be an aluminum electrode collector and include a positive electrode coating portion coated with the positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode coating portion may be manufactured, for example, by applying the positive electrode active material to a portion of at least one surface of the aluminum electrode collector, and the remaining portion of the aluminum electrode collector, which is not coated with the positive electrode active material, may be the positive electrode non-coating portion.

The positive electrode non-coating portion of the present invention may be provided on each of both ends of the positive electrode.

In the positive electrode non-coating portion, a positive electrode tab 111 may be electrically connected to extend from the positive electrode.

The positive electrode tab 111 may be disposed on each of the positive electrode non-coating potions disposed both ends of the positive electrode to extend from each of both the ends of the positive electrode.

In the positive electrode tab 111, a positive electrode lead part 113 may be electrically connected to extend to the outside of the case 10. Here, the positive electrode lead part 113 may be connected to one of the positive electrode tabs 111 extending from both the ends of the positive electrode.

The negative electrode may be a copper electrode collector and include a negative electrode coating portion coated with the negative electrode active material and a negative electrode non-coating portion which is not coated with the negative electrode active material.

The negative electrode active material may be a carbon material such as crystalline carbon, amorphous carbon, a carbon composite, and a carbon fiber, a lithium metal, or a lithium alloy.

The negative electrode coating portion may be manufactured, for example, by applying the negative electrode active material to a portion of at least one surface of the copper electrode collector, and the remaining portion of the copper electrode collector, which is not coated with the negative electrode active material, may be the negative electrode non-coating portion.

In the negative electrode non-coating portion, a negative electrode tab 121 may be electrically connected to extend from the negative electrode.

The negative electrode tab 121 may be disposed on each of the negative electrode non-coating potions disposed both ends of the negative electrode to extend from each of both the ends of the negative electrode.

In the negative electrode tab 121, a negative electrode lead part 123 may be electrically connected to extend to the outside of the case 10. Here, the negative electrode lead part 123 may be connected to the negative electrode tab 111, which is disposed at a side opposite to the side at which the positive electrode lead part 113, of the negative electrode tabs 111 extending from both the ends of the negative electrode.

The separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

The first bus bar 200 may be laminated on the outside of the positive electrode disposed on the outermost portion of the electrode assembly 100 with the separator therebetween and be a foil made of a copper material.

A negative electrode bus bar tab 210 electrically connected to the negative electrode tab 121 of the electrode assembly 100 may extend from each of both ends of the first bus bar 200.

The negative electrode bus bar tab 210 of the first bus bar 200 provided as the foil made of the copper material may be electrically connected to the negative electrode tab 121 of the electrode assembly 100 to allow the negative electrode tab 121 of the electrode assembly 100 to serve as a multi tab, thereby reducing electric resistance of the negative electrode tab 121.

The first bus bar 200 may be provided by applying a negative electrode active material on the foil made of the copper material.

The negative electrode active material may be provided on one surface of a side of the first bus bar 200, which faces the electrode assembly 100. In the first bus bar 200, the negative electrode active material may be provided on only one surface of the first bus bar 200 to prevent an outer appearance of the case 10 from being deformed.

In the first bus bar 200, the negative electrode active material may be applied to increase capacity of the electrode assembly 100.

The second bus bar 300 may be laminated on the outside of the negative electrode disposed on the outermost portion of the electrode assembly 100 with the separator therebetween and be a foil made of an aluminum material.

A positive electrode bus bar tab 310 electrically connected to the positive electrode tab 111 of the electrode assembly 100 may extend from each of both ends of the second bus bar 300.

The positive electrode bus bar tab 310 of the second bus bar 300 provided as the foil made of the aluminum material maybe electrically connected to the positive electrode tab 111 of the electrode assembly 100 to allow the positive electrode tab 111 of the electrode assembly 100 to serve as a multi tab, thereby reducing electric resistance of the positive electrode tab 111.

The second bus bar 300 may be provided by applying a positive electrode active material on the foil made of the aluminum material.

The positive electrode active material may be provided on one surface of a side of the second bus bar 300, which faces the electrode assembly 100. In the second bus bar 300, the positive electrode active material may be provided on only one surface of the second bus bar 300 to prevent the outer appearance of the case 10 from being deformed.

In the second bus bar 300, the positive electrode active material may be applied to increase the capacity of the electrode assembly 100.

As described above, according to the present invention, the bus bar may be provided in the electrode assembly to form the multi tab, thereby reducing the electric resistance.

According to the present invention, the active material may be applied to the bus bar to increase the capacity of the secondary battery.

According to the present invention, the secondary battery may increase in output and energy density without additional parts such as the module/pack.

Although the secondary battery according to the present invention has been described above with reference to the exemplary drawings, various changes and modifications may be made thereto by one skilled in the art without departing from the scope and spirit of the invention as set forth in the appended claims.

What is claimed is:

1. A secondary battery comprising:
an electrode assembly in which a positive electrode and a negative electrode are alternately laminated with a separator therebetween;
a first bus bar laminated on the outside of the positive electrode disposed on the outermost portion of one side of the electrode assembly with a first bus bar separator therebetween;
a second bus bar laminated on the outside of the negative electrode disposed on the outermost portion of the other side of the electrode assembly with a second bus bar separator therebetween;
a case accommodating the electrode assembly, the first bus bar, and the second bus bar; and
a negative electrode lead directly connected to the electrode assembly to extend to the outside of the case,
wherein the electrode assembly includes:
first and second positive electrode tabs respectively extending in a length direction from opposite ends of the positive electrode with respect to the length direction, and
first and second negative electrode tabs respectively extending in the length direction from opposite ends of the negative electrode with respect to the length direction, and
wherein the first bus bar includes first and second negative electrode bus bar tabs directly connected to the first and second negative electrode tabs, respectively
wherein the first negative electrode tab is directly connected to the negative electrode lead,
wherein the second negative electrode tab is electrically connected to the negative electrode lead through the second negative electrode bus bar tab, the first bus bar, the first negative electrode bus bar tab, and the first negative electrode tab, and
wherein the second negative electrode tab is electrically connected to the outside of the case through the second negative electrode bus bar tab, the first bus bar, the first negative electrode bus bar tab, the first negative electrode tab, and the negative electrode lead.

2. The secondary battery of claim 1, wherein a negative electrode active material is applied to an electrode assembly-side one surface of the first bus bar to increase capacity of the electrode assembly.

3. The secondary battery of claim 1, wherein the first and second negative electrode bus bar tabs of the first bus bar are connected to the first and second negative electrode tabs to reduce electric resistance.

4. The secondary battery of claim 1, wherein a positive electrode active material is applied to an electrode assembly-side one surface of the second bus bar to increase capacity of the electrode assembly.

5. The secondary battery of claim 1, wherein the second bus bar includes first and second positive electrode bus bar tabs electrically connected to the first and second positive electrode tabs, respectively.

6. The secondary battery of claim 5, wherein the first and second positive electrode bus bar tabs of the second bus bar are connected to the first and second positive electrode tabs to reduce electric resistance.

7. The secondary battery of claim 5, further comprising a positive electrode lead electrically connected to the first positive electrode tab to extend to the outside of the case,
wherein the second positive electrode tab is electrically connected to the positive electrode lead through the second positive electrode bus bar tab, the second bus bar, the first positive electrode bus bar tab, and the first positive electrode tab, and
wherein the second positive electrode tab is electrically connected to the outside of the case through the second positive electrode bus bar tab, the second bus bar, the first positive electrode bus bar tab, the first positive electrode tab, and the positive electrode lead.

8. The secondary battery of claim 1, wherein the first bus bar comprises a foil made of a copper (Cu) material.

9. The secondary battery of claim 1, wherein the second bus bar comprises a foil made of an aluminum (Al) material.

10. The secondary battery of claim 8, wherein the second bus bar comprises a foil made of an aluminum (Al) material.

11. A secondary battery comprising:
an electrode assembly in which a positive electrode and a negative electrode are alternately laminated with a separator therebetween;
a first bus bar laminated on the outside of the positive electrode disposed on the outermost portion of one side of the electrode assembly with a first bus bar separator therebetween;

a second bus bar laminated on the outside of the negative electrode disposed on the outermost portion of the other side of the electrode assembly with a second bus bar separator therebetween;
a case accommodating the electrode assembly, the first bus bar, and the second bus bar; and
a positive electrode lead directly connected to the electrode assembly to extend to the outside of the case,
wherein the electrode assembly includes:
    first and second positive electrode tabs respectively extending in a length direction from opposite ends of the positive electrode with respect to the length direction, and
    first and second negative electrode tabs respectively extending in the length direction from opposite ends of the negative electrode with respect to the length direction, and
wherein the second bus bar includes first and second positive electrode bus bar tabs directly connected to the first and second positive electrode tabs, respectively,
wherein the first positive electrode tab is directly connected to the positive electrode lead,
wherein the second positive electrode tab is electrically connected to the positive electrode lead through the second positive electrode bus bar tab, the first bus bar, the first positive electrode bus bar tab, and the first positive electrode tab, and
wherein the second positive electrode tab is electrically connected to the outside of the case through the second positive electrode bus bar tab, the first bus bar, the first positive electrode bus bar tab, the first positive electrode tab, and the positive electrode lead.

12. The secondary battery of claim 11, wherein the first and second positive electrode bus bar tabs of the second bus bar are connected to the first and second positive electrode tabs to reduce electric resistance.

* * * * *